(12) United States Patent
Ohashi

(10) Patent No.: US 9,787,204 B2
(45) Date of Patent: *Oct. 10, 2017

(54) SWITCHING POWER SUPPLY DEVICE

(71) Applicant: FUJI ELECTRIC CO., LTD., Kawasaki-shi (JP)

(72) Inventor: Hidetomo Ohashi, Matsumoto (JP)

(73) Assignee: FUJI ELECTRIC CO., LTD., Kawasaki-Shi (JP)

(*) Notice: Subject to any disclaimer, the term of this patent is extended or adjusted under 35 U.S.C. 154(b) by 1 day.

This patent is subject to a terminal disclaimer.

(21) Appl. No.: 15/207,488

(22) Filed: Jul. 11, 2016

(65) Prior Publication Data
US 2016/0322912 A1 Nov. 3, 2016

Related U.S. Application Data

(63) Continuation of application No. 14/583,085, filed on Dec. 24, 2014, now Pat. No. 9,413,255, which is a (Continued)

(30) Foreign Application Priority Data

Aug. 27, 2012 (JP) ................................. 2012-187070

(51) Int. Cl.
H02M 3/335 (2006.01)
H02M 1/08 (2006.01)
H02M 1/00 (2006.01)

(52) U.S. Cl.
CPC ......... H02M 3/33553 (2013.01); H02M 1/08 (2013.01); H02M 3/33507 (2013.01); (Continued)

(58) Field of Classification Search
CPC ............... H02M 3/28; H02M 3/33507; H02M 3/33546; H02M 3/33569; H02M 2001/0058
(Continued)

(56) References Cited

U.S. PATENT DOCUMENTS 5,886,884 A 3/1999 Baek et al.
6,483,722 B2 11/2002 Nozawa et al.
(Continued)

FOREIGN PATENT DOCUMENTS

CN 101989814 A 3/2011
JP H10-243646 A 9/1998
(Continued)

Primary Examiner — Kyle J Moody
(74) Attorney, Agent, or Firm — Rabin & Berdo, P.C.

(57) ABSTRACT

A drive control circuit for a switching power supply device. The drive control circuit includes an output control circuit configured to generate an output control signal with a pulse width corresponding to an output voltage of the switching power supply device, a threshold setting circuit configured to determine a winding threshold voltage according to a direct current input voltage applied to the series resonant circuit formed of the leakage inductance of an isolation transformer and a capacitor of the switching power supply device, a winding detection circuit configured to compare a voltage generated in a tertiary winding of the isolation transformer with the winding threshold voltage and to accordingly output a winding detection signal, and a drive circuit configured to receive the winding detection signal and the output control signal, and to generate a pulse-width controlled drive signal for driving a first switching element of the switching power supply device.

10 Claims, 9 Drawing Sheets

Related U.S. Application Data continuation of application No. PCT/JP2013/072476, filed on Aug. 22, 2013.

(52) U.S. Cl.
CPC .... *H02M 3/33546* (2013.01); *H02M 3/33569* (2013.01); *H02M 2001/0058* (2013.01); *Y02B 70/1433* (2013.01); *Y02B 70/1491* (2013.01)

(58) Field of Classification Search
USPC ....... 363/16, 20, 21.01, 21.02, 21.12, 21.15, 363/21.16, 97
See application file for complete search history.

(56) References Cited

U.S. PATENT DOCUMENTS

| | | |
|---|---|---|
| 7,391,194 B2 | 6/2008 | Brown |
| 8,787,040 B2 | 7/2014 | Huang et al. |
| 9,093,904 B2 | 7/2015 | Sato et al. |
| 9,413,255 B2 * | 8/2016 | Ohashi .............. H02M 3/33507 |
| 2007/0114952 A1 | 5/2007 | Yang |
| 2007/0274105 A1 | 11/2007 | Osaka |
| 2008/0219033 A1 | 9/2008 | Nishikawa |
| 2012/0063174 A1 | 3/2012 | Kuwabara et al. |
| 2013/0308347 A1 | 11/2013 | Sato et al. |
| 2014/0376281 A1 | 12/2014 | Ohashi |
| 2016/0081175 A1 | 3/2016 | Kamata |

FOREIGN PATENT DOCUMENTS

| | | |
|---|---|---|
| JP | 2000-308346 A | 11/2000 |
| JP | 2007-535286 A | 11/2007 |
| JP | 2008-228382 A | 9/2008 |
| WO | WO-2012/105077 A1 | 8/2012 |

\* cited by examiner

SWITCHING POWER SUPPLY DEVICE

CROSS-REFERENCE TO RELATED APPLICATIONS

This application is a continuation application of U.S. application Ser. No. 14/583,085, filed on Dec. 24, 2014, and now allowed on Apr. 13, 2016, which is a bypass continuation application of PCT/JP2013/072476, filed on Aug. 22, 2013. Further, this application claims the benefit of priority of Japanese application serial numbers 2012-187070, filed on Aug. 27, 2012. The disclosures of these prior applications are incorporated herein by reference.

TECHNICAL FIELD

The present invention relates to a switching power supply device designed to improve power conversion efficiency.

BACKGROUND ART

As a switching power supply device for various kinds of electronic instruments, a resonant converter is known. The resonant converter is configured by connecting a primary winding of an isolation transformer to a direct current voltage source via a capacitor. A series resonant circuit is formed of the leakage inductance of the isolation transformer and the capacitor. The resonant converter controls a current flowing through the series resonant circuit using first and second switching elements which are complementarily on/off driven, and obtains a stepped-up/down direct current voltage from the side of secondary windings of the isolation transformer.

A soft switching technology in this kind of switching power supply device is proposed in, for example, U.S. Pat. Nos. 5,886,884 and 7,391,194. The soft switching technology is such as to significantly reduce loss in the switching elements by turning on the switching elements when a voltage applied to the switching elements is zero (0) or when a current flowing through the inductance is zero (0). Also, as the switching power supply device, a multi-oscillated current resonant converter which causes the series resonant circuit to perform a current resonance operation is also proposed. The multi-oscillated current resonant converter, as well as causing the first switching element to perform a separately excited oscillation operation with a drive signal pulse-width controlled in accordance with an output voltage, causes the second switching element to perform a self-oscillation operation utilizing a voltage generated in an auxiliary winding of the isolation transformer.

This kind of resonance type switching power supply device includes a series resonant circuit which, by connecting a primary winding P1 of an isolation transformer T to a direct current voltage source B via a capacitor C, as shown in, for example, FIG. 5, is formed of the leakage inductance of the isolation transformer T and the capacitor C. A first switching element Q1 connected in series to the primary winding P1 of the isolation transformer T, by being driven by a drive control circuit A which performs a separately excited oscillation operation, applies a direct current input voltage Vin from the direct current voltage source B to the series resonant circuit. The drive control circuit A is formed of, for example, a power supply IC (Integrated Circuit). Also, a second switching element Q2 connected in parallel to the series resonant circuit, by being on-driven by the drive control circuit A when the first switching element Q1 is turned off, forms a resonant current path of the series resonant circuit. The first and second switching elements Q1 and Q2 are each formed of, for example, a high-voltage n-type MOS-FET (Metal-Oxide-Semiconductor Field-Effect Transistor).

Power generated in secondary windings S1 and S2 of the isolation transformer T is rectified and smoothed via an output circuit formed of diodes D1 and D2 and an output capacitor Cout, and supplied to an unshown load as an output voltage Vout. A resonance type power conversion device main body is constructed by these circuit portions. Also, the output voltage Vout obtained in the output circuit, specifically, the deviation between the output voltage Vout and an output voltage set value, is detected by an output voltage detection circuit VS and fed back to the drive control circuit A as an FB voltage via a photocoupler PC. The FB voltage fed back to the drive control circuit A serves to pulse-width modulate an output control signal which on/off drives the first and second switching elements Q1 and Q2, thereby stabilizing the output voltage Vout. Direct current power supplied from the direct current voltage source B, after being filtered via an input capacitor Cin, is supplied to the switching power supply device as the input voltage Vin.

Herein, the drive control circuit A, as an outline configuration thereof is shown in FIG. 6, is configured mainly of an output control circuit 2, a winding detection circuit 3, and a drive signal generation circuit 4. The output control circuit 2 is formed of a PWM (Pulse-Width Modulation) control circuit which generates, as a PWM signal, an output control signal with a pulse width corresponding to a feedback signal FB fed back from the output voltage detection circuit VS. Also, the winding detection circuit 3 determines the polarity of a voltage generated in a tertiary winding P3 of the isolation transformer T, and outputs a winding detection signal VW. The drive signal generation circuit 4, in accordance with the winding detection signal VW and output control signal, generates a pulse-width controlled drive signal of the first switching element Q1.

Reference numeral 5 in FIG. 6 is a drive amplifier acting as a drive circuit which drives the first switching element Q1 upon receiving the drive signal output by the drive signal generation circuit 4. Also, reference numeral 6 is an internal power supply circuit which, upon receiving a drive voltage VCC applied to the drive control circuit A, generates an internal voltage VDD necessary for the output control circuit 2, winding detection circuit 3, and drive signal generation circuit 4 to operate.

A brief description will be given of an operation of the multi-oscillated current resonant converter which is the switching power supply device of the heretofore described configuration. In the multi-oscillated current resonant converter, when the second switching element Q2 is in an off-state, a current flows through the series resonant circuit by turning on the first switching element Q1. In this condition, when the first switching element Q1 is turned off, an unshown parasitic capacitance of the first switching element Q1 is charged by a current flowing through the inductance of the series resonant circuit. At the same time, an unshown parasitic capacitance of the second switching element Q2 is discharged by the current.

Further, when a voltage charged in the parasitic capacitance of the first switching element Q1 reaches the direct current input voltage Vin, the second switching element Q2 is turned on, thereby realizing the zero-voltage switching of the second switching element Q2. As a result of turning on the second switching element Q2, power energy accumulated in the capacitor C flows via the second switching element Q2. Consequently, the current flowing through the inductance of the series resonant circuit is inverted.

Subsequently, when the second switching element Q2 is turned off, the parasitic capacitance of the second switching element Q2 is charged by the current inverted in the way heretofore described. At the same time, the parasitic capacitance of the first switching element Q1 is discharged by the inverted current. Further, it is detected, from an inversion of the polarity of the voltage generated in the tertiary winding P3, that the voltage charged in the parasitic capacitance of the second switching element Q2 reaches a zero (0) voltage. The first switching element Q1 is turned on at this detection timing, thereby realizing the zero-voltage switching of the first switching element Q1. By the first switching element Q1 being turned on, the current of the series resonant circuit is inverted and flows again via the first switching element Q1.

SUMMARY OF INVENTION

Technical Problem

Herein, the winding detection circuit 3 includes two voltage dividing resistors R1 and R2 connected in series and a comparator 7, as shown in, for example, FIG. 7. The voltage dividing resistors R1 and R2 divide the internal voltage VDD or drive voltage VCC and sets a winding threshold voltage VWth. The comparator 7 compares the winding threshold voltage VWth and a winding voltage generated in the tertiary winding P3 of the isolation transformer T. Further, when the winding voltage exceeds the winding threshold voltage VWth, the comparator 7, determining from the excess that the polarity of the winding voltage is inverted, outputs the winding detection signal VW.

Herein, the winding threshold voltage VWth is preset based on the specifications of the switching power supply device. Because of this, for example, when the direct current input voltage Vin changes due to the aging, characteristic variation, or the like of parts configuring the switching power supply device, it is undeniable that a gap occurs in the timing of generating the winding detection signal VW. Specifically, at a low input voltage when the direct current input voltage Vin is lower than a voltage set in the specifications, the winding voltage generated in the tertiary winding P3 decreases. Because of this, the timing of generating the winding detection signal VW is delayed, as shown in, for example, FIG. 8. Then, a delay occurs in the timing of turning on the first switching element Q1, and an ineffective time for power conversion increases. As a result, a current peak lengthens out, loss in the first switching element Q1 increases, and power conversion efficiency decreases.

In contrast, at a high input voltage when the direct current input voltage Vin is higher than the voltage set in the specifications, the winding voltage generated in the tertiary winding P3 increases. Thus, the timing of generating the winding detection signal VW is accelerated, as shown in, for example, FIG. 9. Then, the first switching element Q1 is turned on before the voltage applied to the first switching element Q1 reaches zero (0). As a result, the zero-voltage switching cannot be performed, loss in the first switching element Q1 increases, and power conversion efficiency decreases.

The invention, having been contrived with these kinds of circumstances in mind, can provide a switching power supply device of a simple configuration. It is thereby possible to realize the zero-voltage switching by appropriately setting the timing of turning on the first and second switching elements regardless of a change in the direct current input voltage Vin, and thus possible to prevent a decrease in conversion efficiency.

Solution to Problem

A switching power supply device according to an embodiment of the invention basically includes a series resonant circuit which, by connecting a primary winding P1 of an isolation transformer T to a direct current voltage source via a capacitor C, is formed of the leakage inductance of the isolation transformer and the capacitor C; a first switching element Q1 which is driven by a drive control circuit which performs a separately excited oscillation operation, and when turned on, applies a direct current input voltage Vin from the direct current voltage source to the series resonant circuit; a second switching element Q2, connected in parallel to the series resonant circuit, which is on-driven by a voltage generated in an auxiliary winding P2 of the isolation transformer when the first switching element is turned off, thus forming a current path of the series resonant circuit; and an output circuit which rectifies, smoothes, and outputs power generated on the side of secondary windings S1 and S2 of the isolation transformer.

Furthermore, the switching power supply device according to the invention is such that the drive control circuit is configured of an output control circuit which generates an output control signal with a pulse width corresponding to an output voltage of the output circuit; a winding detection circuit which compares a voltage generated in a tertiary winding P3 of the isolation transformer with a winding threshold voltage VWth and outputs a winding detection signal VW; and a drive signal generation circuit which, in accordance with the winding detection signal and output control signal, generates a pulse-width controlled drive signal which drives the first switching element. Further, in particular, the switching power supply device is characterized in that the drive control circuit is provided with a threshold setting circuit which, by changing the winding threshold voltage VWth set in the winding detection circuit in accordance with the direct current input voltage Vin applied to the series resonant circuit, adjusts the timing of turning on the first switching element Q1.

The drive circuit is formed of, for example, one which generates a drive signal with a pulse width with a rise of the winding detection signal VW, which indicates an inversion of the polarity of the voltage generated in the tertiary winding P3 of the isolation transformer, as an on-trigger and a rise of the output control signal as an off-trigger. Further, the threshold setting circuit is configured so as to set the winding threshold voltage VWth to be high when the direct current input voltage Vin is higher than a preset threshold voltage Vth, and set the winding threshold voltage VWth to be low when the direct current input voltage Vin is lower than the threshold voltage Vth. Preferably, the threshold setting circuit is configured so as to, by switching between analog switches in accordance with a result of the comparison of the direct current input voltage Vin and preset threshold voltage Vth, select one of a plurality of preset winding threshold voltages VWth1 and VWth2 to VWthn and set the one in the winding detection circuit.

Advantageous Effects of Invention

According to the switching power supply device of the heretofore described configuration, as the winding threshold voltage VWth is changed in accordance with a change in the direct current input voltage Vin, it is possible to appropriately generate the winding detection signal VW at the timing at which the voltage applied to the first switching element Q1 reaches zero (0). As a result of this, it is possible to zero-voltage switch the first switching element Q1 regardless of a change in the direct current input voltage Vin. Therefore, according to the invention, it is possible to effectively suppress an increase in loss in the first switching element Q1.

Also, according to the switching power supply device of the previously described configuration, it is possible to prevent a gap in the timing of turning on the first switching element Q1 resulting from a change in the direct current input voltage Vin, with a simple configuration such as to change the winding threshold voltage VWth in accordance with a change in the direct current input voltage Vin. Consequently, according to the invention, the advantage of it being possible to relax circuit design conditions set with the aging, characteristic variation, or the like of parts configuring the switching power supply device taken into account, or the like, is produced.

DESCRIPTION OF EMBODIMENTS

Figure 1:
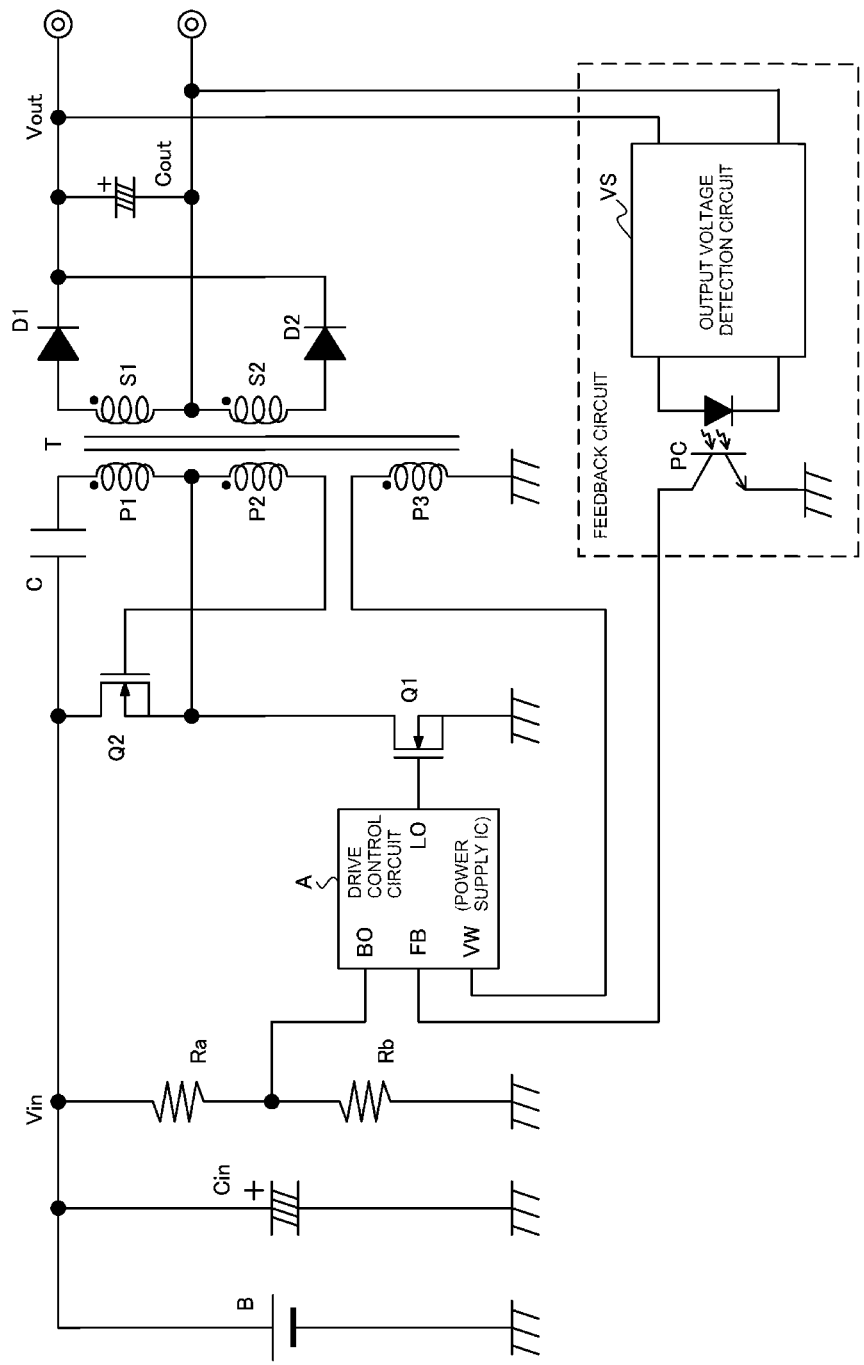
FIG. 1 is an outline configuration diagram of a multi-oscillated current resonant converter acting as a switching power supply device according to an embodiment of the invention.

Hereafter, a description will be given, referring to the drawings, of a switching power supply device according to an embodiment of the invention.

Figure 5:
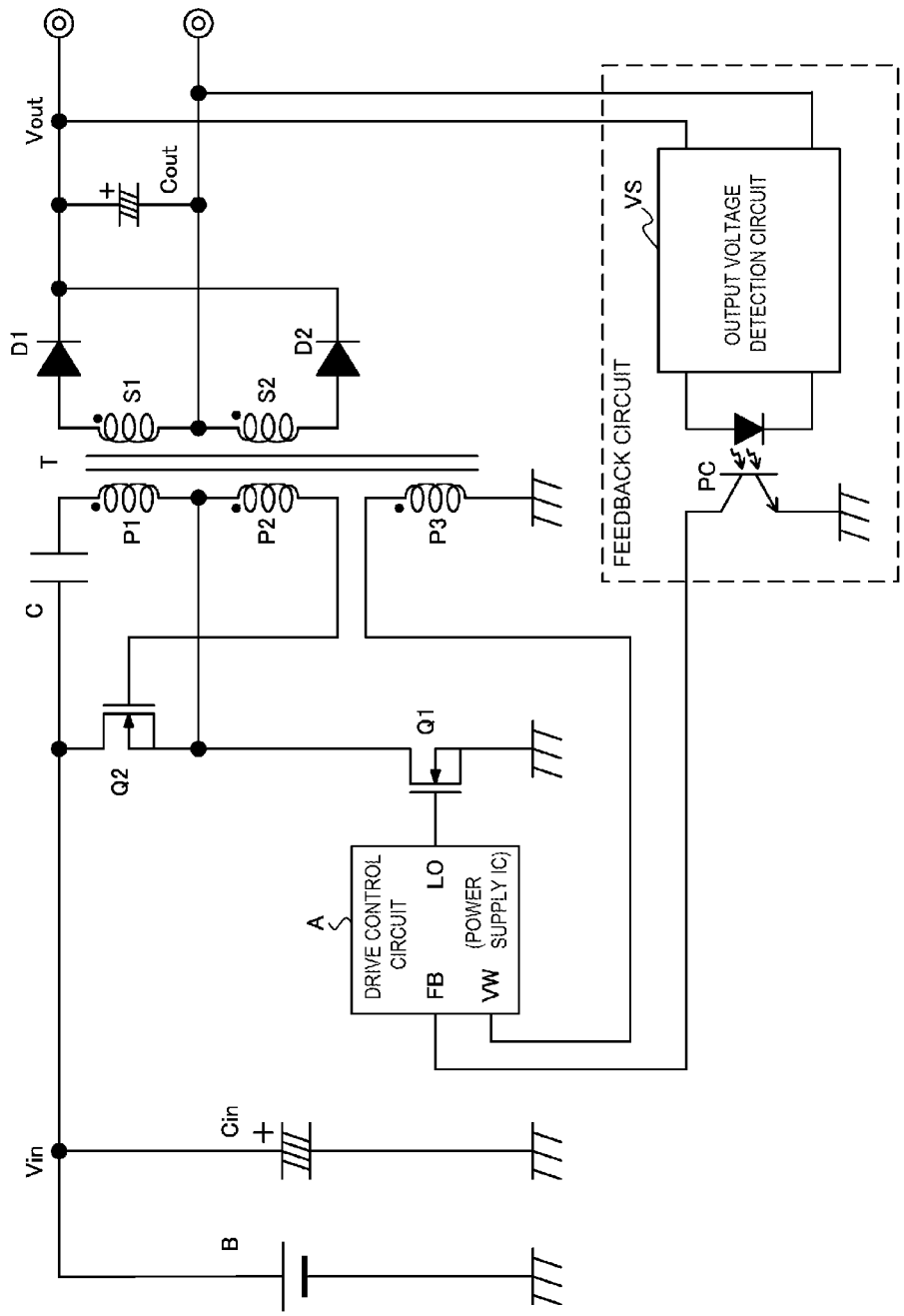
FIG. 5 is an outline configuration diagram of a multi-oscillated current resonant converter.
Figure 6:
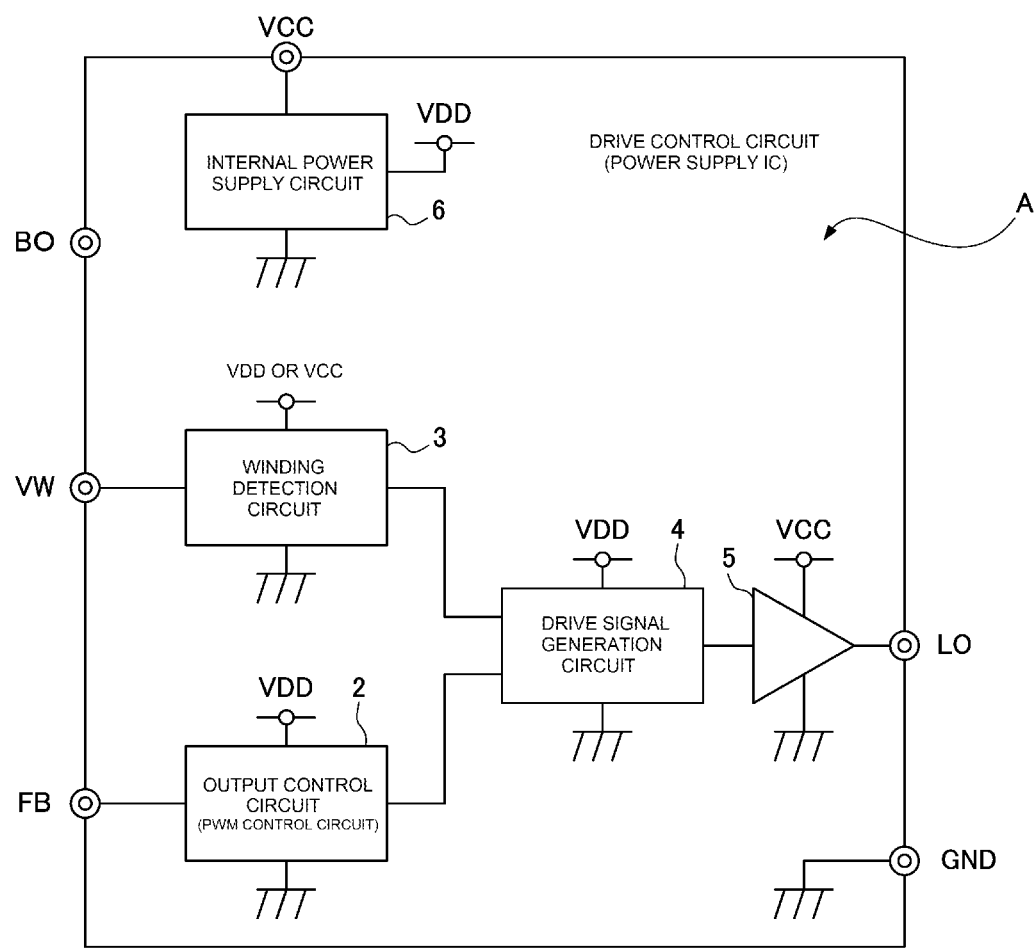
FIG. 6 is a diagram showing a configuration example of a drive control circuit shown in FIG. 5.

FIG. 1 is an outline configuration diagram of a multi-oscillated current resonant converter acting as the switching power supply device according to the embodiment. The multi-oscillated current resonant converter is basically configured in the same way as a heretofore known multi-oscillated current resonant converter shown in FIG. 5. Consequently, the same signs are given to portions equivalent to those of the multi-oscillated current resonant converter shown in FIGS. 5 and 6, and a redundant description thereof will be omitted.

Figure 2:
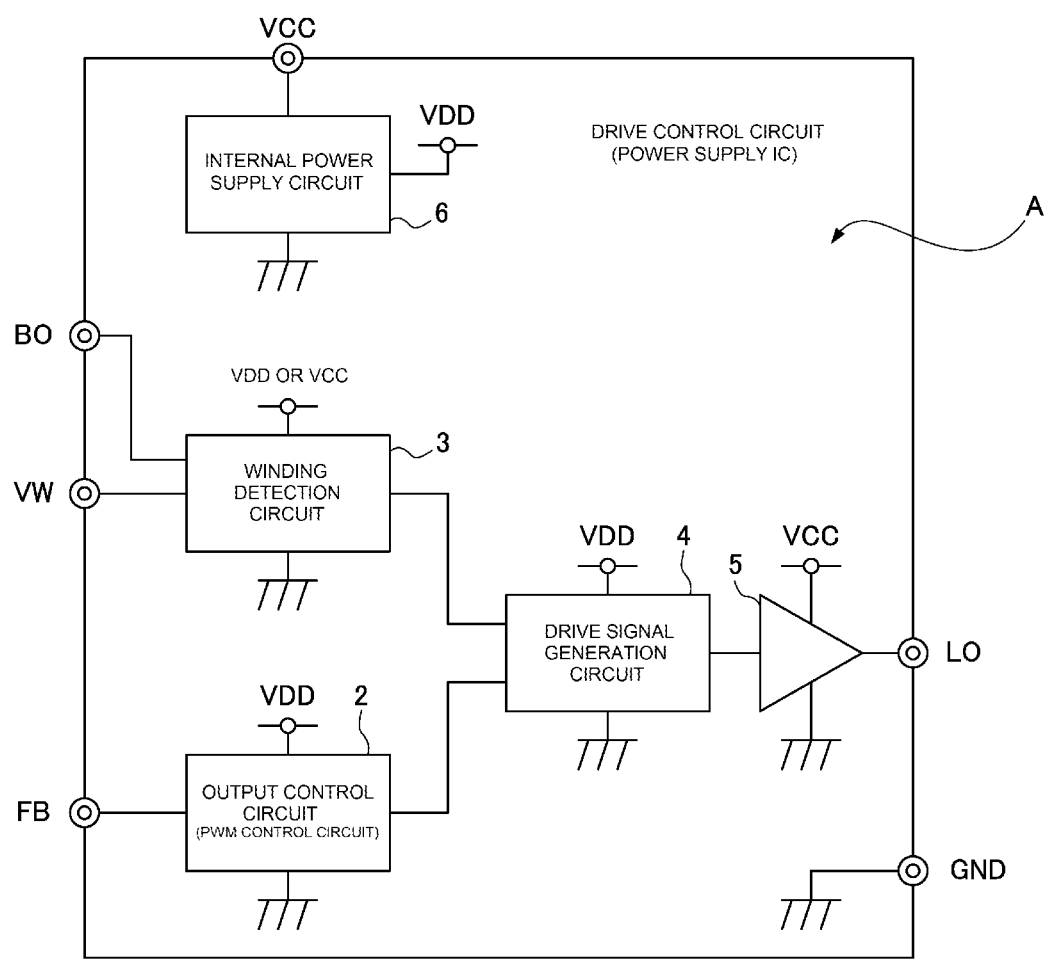
FIG. 2 is a diagram showing a configuration example of a drive control circuit shown in FIG. 1.

A switching power supply device 1 formed of the multi-oscillated current resonant converter includes voltage dividing resistors Ra and Rb connected in series, as shown in FIG. 1. The voltage dividing resistors Ra and Rb connected in series, by being connected in parallel to the input capacitor Cin, divide and detect the direct current input voltage Vin. Further, a voltage BO proportional to the direct current input voltage Vin detected via the voltage dividing resistors Ra and Rb is given to a winding detection circuit 3 in the drive control circuit (power supply IC) A which drives the first switching element Q1, as shown in FIG. 2. Further, the switching power supply device 1 is characterized in that the winding detection circuit 3 is configured so as to variably set the previously described winding threshold voltage VWth in accordance with a change in the direct current input voltage Vin.

Figure 3:
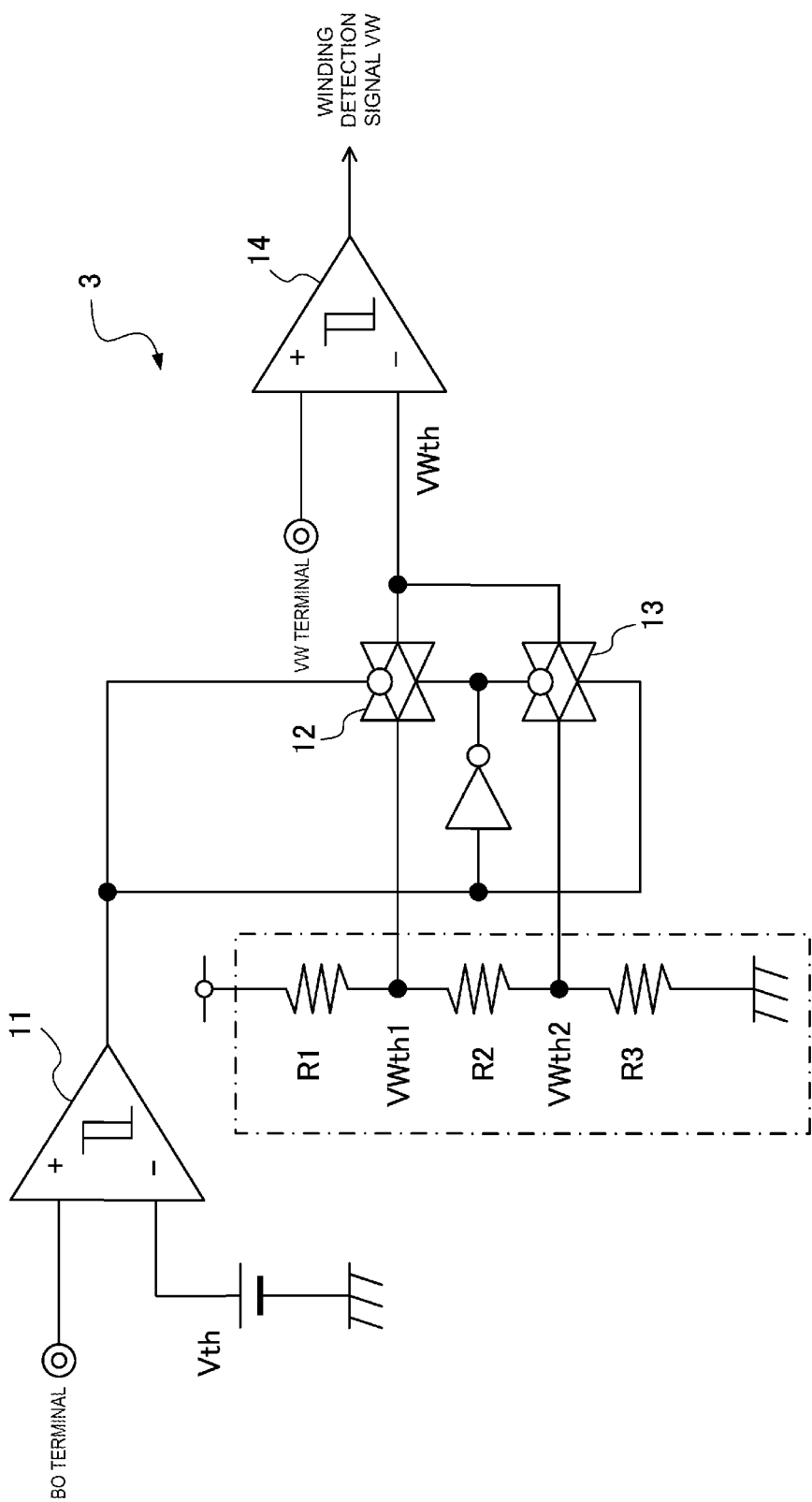
FIG. 3 is a diagram showing a configuration example of a winding detection circuit shown in FIG. 2.
Figure 7:
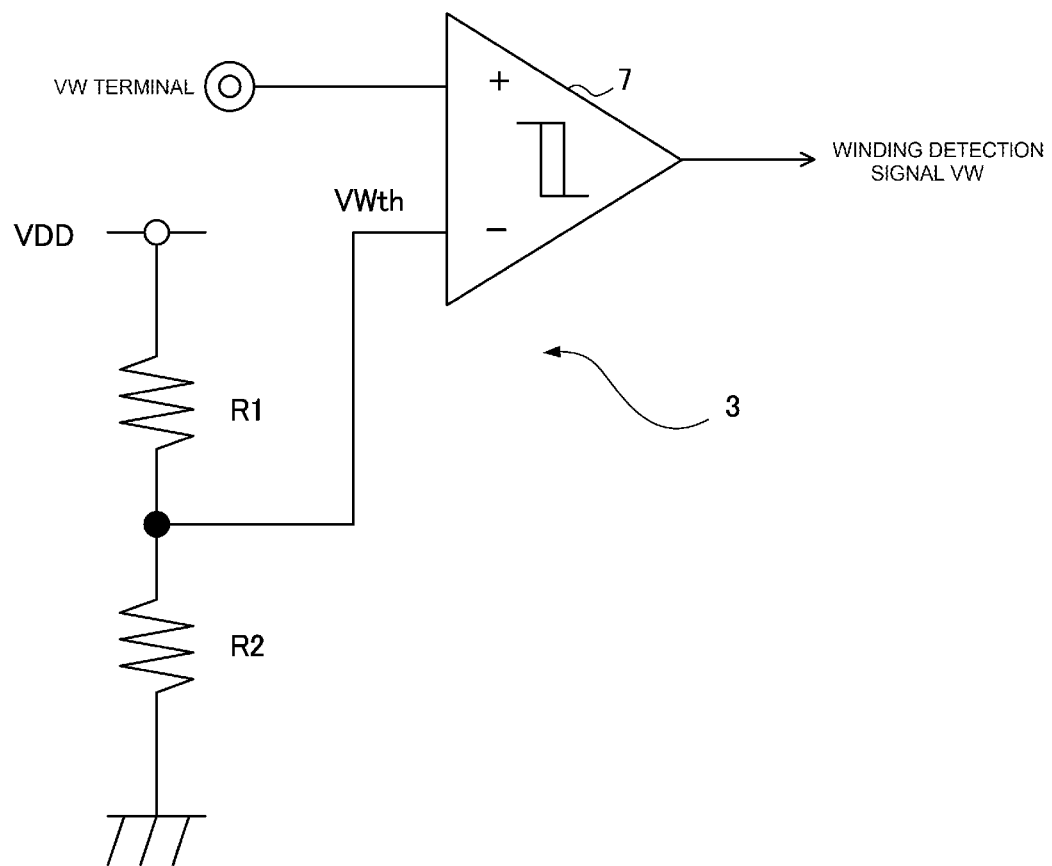
FIG. 7 is a diagram showing a configuration example of a winding detection circuit shown in FIG. 6.
Figure 8:
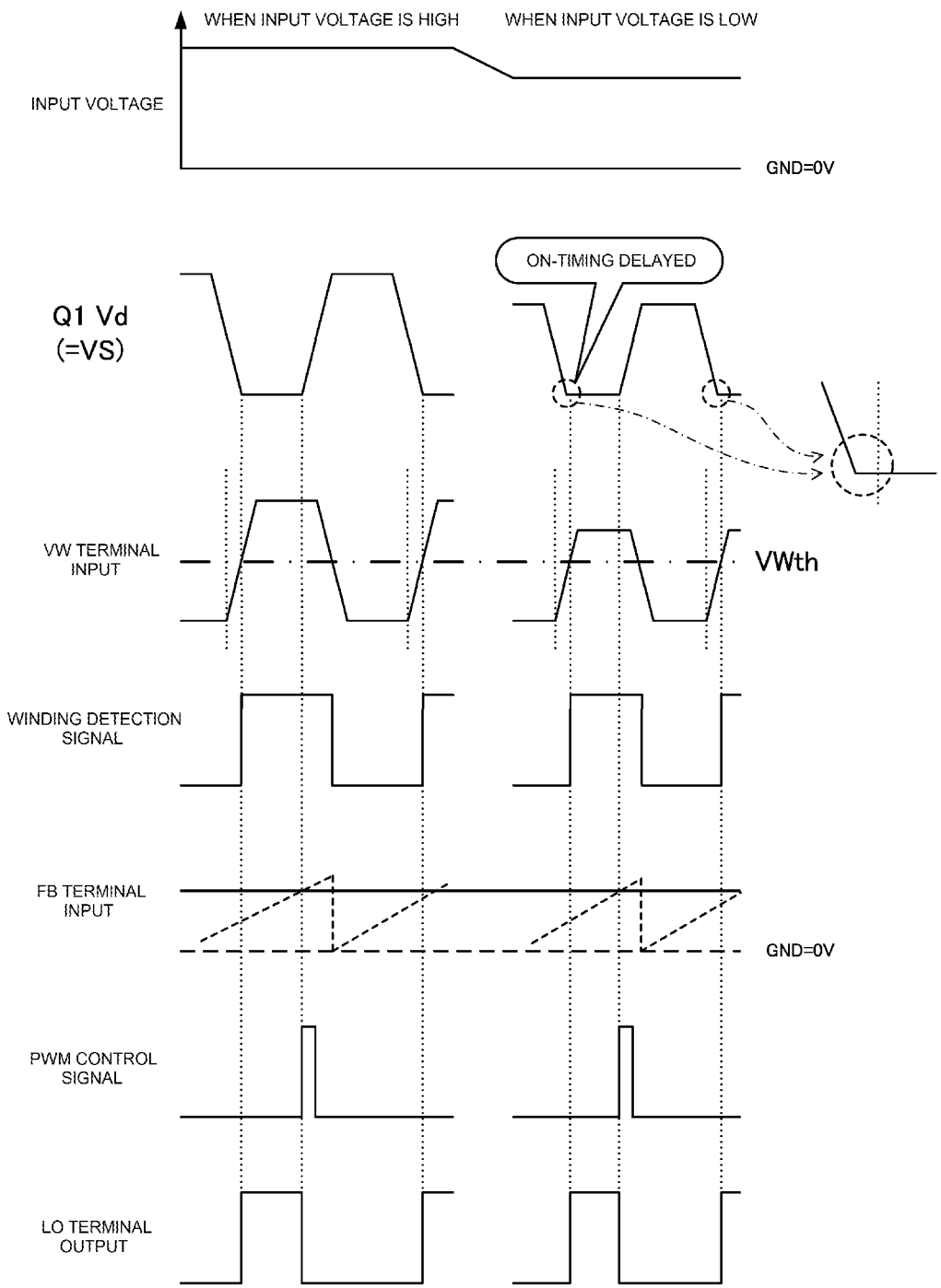
FIG. 8 is a signal waveform diagram for illustrating a problem when an input voltage Vin is low in a switching power supply device shown in FIG. 5.
Figure 9:
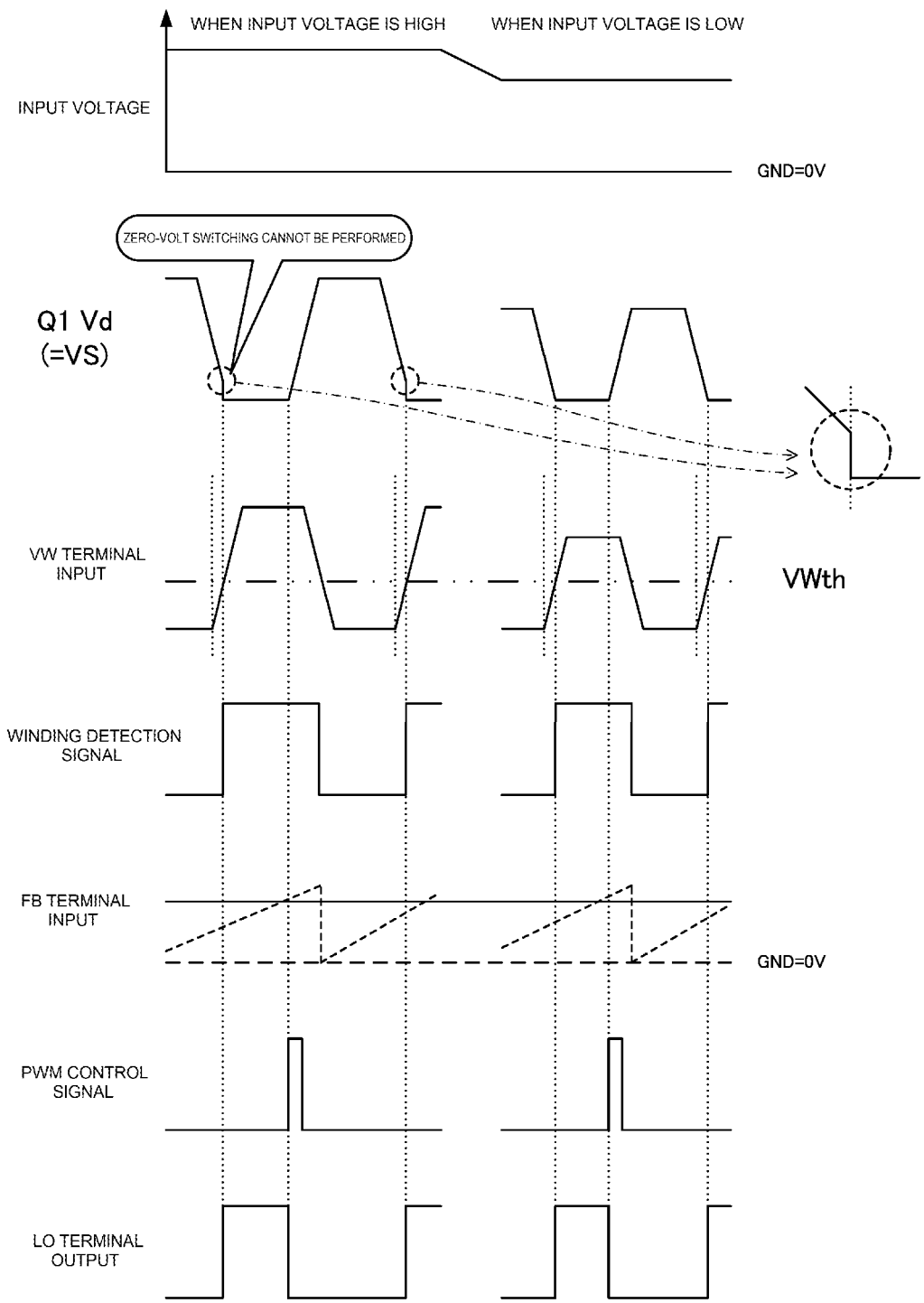
FIG. 9 is a signal waveform diagram for illustrating a problem when the input voltage Vin is high in the switching power supply device shown in FIG. 5.

The winding detection circuit 3 which variably sets the winding threshold voltage VWth in accordance with a change in the direct current input voltage Vin, specifically, includes a first comparator 11 which compares the voltage BO, which is proportional to the direct current input voltage Vin, with a preset threshold voltage Vth, as shown in FIG. 3. The first comparator 11 assumes the role of complementarily switching between, for example, two analog switches 12 and 13. Specifically, the first comparator 11 selects one of two kinds of different winding threshold voltages VWth1 and VWth2 (VWth1>VWth2), which are set by three voltage dividing resistors R1, R2, and R3 connected in series dividing the internal voltage VDD or drive voltage VCC, and gives the one to a second comparator 14, via the analog switches 12 and 13. Consequently, the second comparator 14 compares one of the winding threshold voltages VWth1 and VWth2 and a winding voltage generated in the tertiary winding P3 of the isolation transformer T. The second comparator 14 corresponds to the previously described comparator 7 shown in FIG. 7.

Specifically, when the direct current input voltage Vin is high and the voltage BO proportional to the direct current input voltage Vin is higher than the threshold voltage Vth, the first winding threshold voltage VWth1 set by the voltage dividing resistors R1, R2, and R3 is set in the second comparator 14. Consequently, the second comparator 14 detects an inversion of the polarity of the winding voltage with the first winding threshold voltage VWth1 as a reference. Conversely, when the direct current input voltage Vin is low and the voltage BO proportional to the direct current input voltage Vin is lower than the threshold voltage Vth, the second winding threshold voltage VWth2 (<VWth1) set by the voltage dividing resistors R1, R2, and R3 is set in the second comparator 14. Consequently, the second comparator 14 detects an inversion of the polarity of the winding voltage with the second winding threshold voltage VWth2 as a reference.

Herein, it is also possible to adopt a configuration such that one of three or more kinds of winding threshold voltages VWth1 and VWth2 to VWthn is selected in accordance with the direct current input voltage Vin and set in the second comparator 14. In this case, a plurality (n−1) of first comparators 11 having different threshold voltages Vth are used to compare the direct current input voltage Vin in parallel. Further, a configuration only has to be such that the respective outputs of the plurality of first comparators 11 are logically processed to alternatively drive the analog switches, thereby selecting one of the plurality of winding threshold voltages VWth1 and VWth2 to VWthn and setting the one in the second comparator 14.

Figure 4:
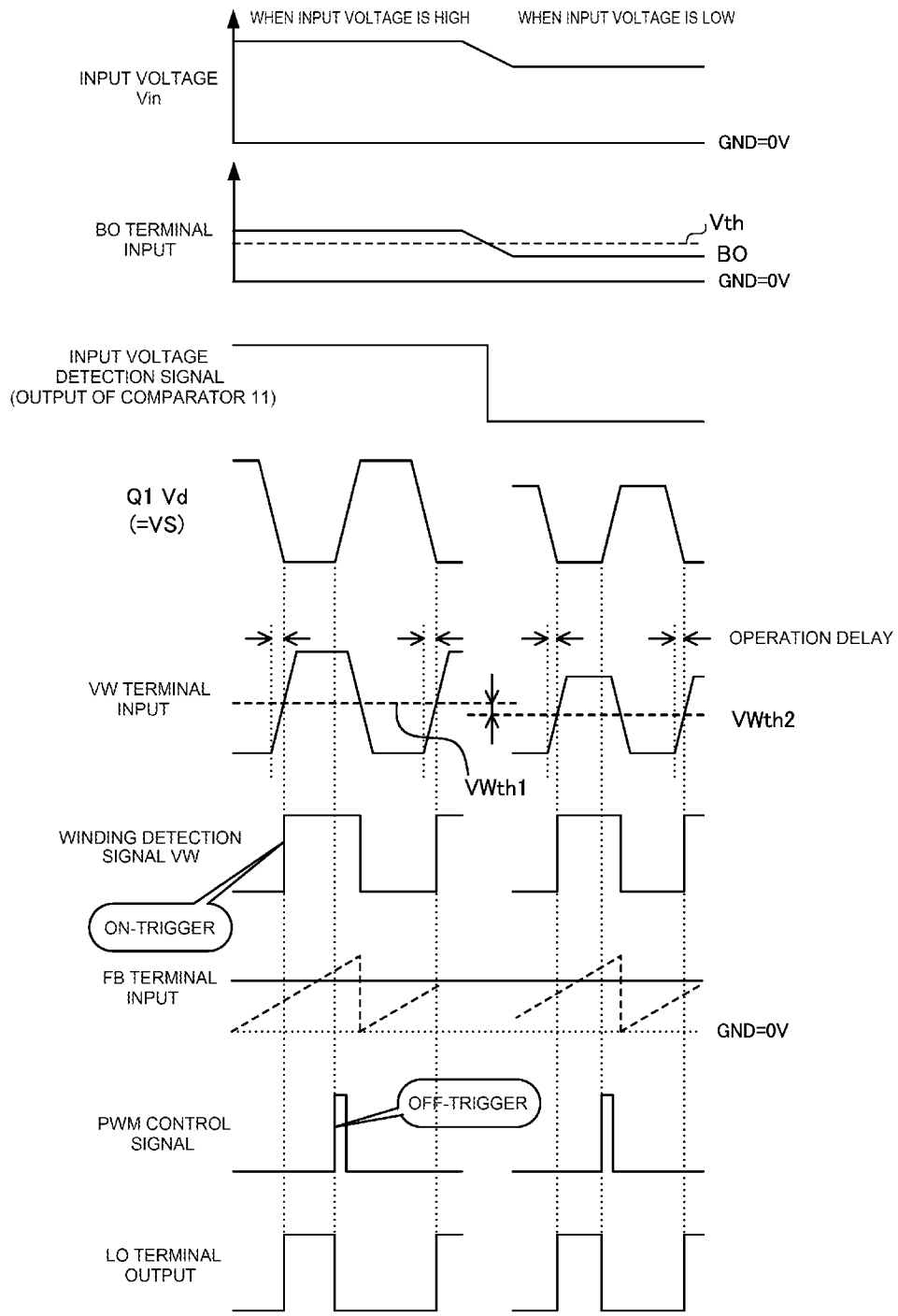
FIG. 4 is a signal waveform diagram for illustrating an operation of the switching power supply device shown in FIG. 1.

According to the winding detection circuit 3 which compares the winding threshold voltage VWth set in accordance with the direct current input voltage Vin and the winding voltage generated in the tertiary winding P3 of the isolation transformer T, as heretofore described, the winding threshold voltage VWth is selected and set in accordance with a change in the direct current input voltage Vin, as shown in FIG. 4. Consequently, even when the winding voltage changes as a result of a change in the direct current input voltage Vin, it is possible to reliably detect a change in the polarity of the winding voltage. Therefore, it is possible to generate a winding detection signal VW at an appropriate timing regardless of a change in the direct current input voltage Vin.

As a result of this, it is possible to turn on the first switching element Q1 in accordance with the timing of an inversion of the polarity of the winding voltage generated in the tertiary winding P3 of the isolation transformer T, and thus in accordance with the timing at which a voltage applied to the first switching element Q1 reaches zero (0). Consequently, it is possible to minimize the switching loss in the first switching element Q1 and improve the conversion efficiency thereof.

Moreover, as the winding threshold voltage VWth is changed in accordance with a change in the direct current input voltage Vin, it is possible to significantly relax circuit design conditions set with the aging, characteristic variation, or the like of parts configuring the switching power supply device taken into account. Furthermore, as it is possible to easily configure the circuit itself which variably sets the winding threshold voltage VWth in accordance with the direct current input voltage Vin, the advantage of it also being easy to incorporate the circuit into the drive control circuit A formed of the power supply IC, or the like, is produced.

The invention is not limited to the heretofore described embodiment. For example, it goes without saying that the winding threshold voltage VWth set in the second comparator 14 in accordance with a change in the direct current input voltage Vin can be set in three or more stages, as previously described. Also, in the embodiment, a pulse-width modulated PWM signal is shown as a drive control signal, the pulse width of which is varied in accordance with an output voltage Vout, but the drive control signal may a pulse-frequency modulated PFM signal.

Furthermore, herein, a second switching element Q2 which self-oscillates is set on a high voltage side, while the first switching element Q1 which is driven by the drive control circuit which performs a separately excited oscillation operation is set on a low voltage side, but it is also possible to set the two switching elements the other way around. In this case, it is sufficient to use p-type MOS-FETs as the first and second switching elements Q1 and Q2, and set the previously described operation logic in the drive control circuit A in an opposite manner. Apart from this, the invention can be implemented modified in various ways without departing from the scope thereof.

The invention claimed is:

1. A switching power supply device, comprising:
   an isolation transformer having a primary winding, a plurality of secondary windings, and a tertiary winding, the primary winding being connected to a direct current voltage source via a capacitor, leakage inductance of the isolation transformer and the capacitor forming a series resonant circuit;
   a first switching element connected in series to the primary winding of the isolation transformer, the first switching element being configured to be driven by a drive control circuit that performs a separately excited oscillation operation, to thereby apply a direct current input voltage from the direct current voltage source to the series resonant circuit;
   a second switching element connected in parallel to the series resonant circuit, the second switching element being configured to be driven upon turning-off of the first switching element, to thereby form a current path of the series resonant circuit;
   an output circuit configured to rectify, smooth, and output power generated on the secondary windings of the isolation transformer; and
   the drive control circuit, including
      an output control circuit configured to generate an output control signal with a pulse width corresponding to an output voltage of the output circuit;
      a winding detection circuit configured to compare a voltage generated in the tertiary winding of the isolation transformer with a winding threshold voltage, and to output a winding detection signal;
      a drive circuit configured to generate, in accordance with the winding detection signal and the output control signal, a pulse-width controlled drive signal for driving the first switching element; and
      a threshold setting circuit configured to change the winding threshold voltage in the winding detection circuit in accordance with the direct current input voltage applied to the series resonant circuit, to thereby adjust the timing of turning on the first switching element.

2. The switching power supply device according to claim 1, wherein
   the pulse-width controlled drive signal, generated by the drive circuit of the drive control circuit, has a pulse with a rise of the winding detection signal being an on-trigger thereof and a rise of the output control signal being an off-trigger thereof.

3. The switching power supply device according to claim 1, wherein the threshold setting circuit is configured to
   set the winding threshold voltage to be high upon detecting that the direct current input voltage is higher than a preset threshold voltage, and
   set the winding threshold voltage to be low upon detecting that the direct current input voltage is lower than the threshold voltage.

4. The switching power supply device according to claim 1, where
   the threshold setting circuit has two analog switches, and is configured to switch between the two analog switches in accordance with a result of comparing the direct current input voltage and a preset threshold voltage, to thereby select one of a plurality of preset winding threshold voltages for use as the winding threshold voltage in the winding detection circuit.

5. A drive control circuit for a switching power supply device that includes
   an isolation transformer having a primary winding, a tertiary winding and a plurality of secondary windings, the primary winding being connected to a direct current voltage source via a capacitor, leakage inductance of the isolation transformer and the capacitor forming a series resonant circuit,
   a first switching element connected in series to the primary winding,
   a second switching element connected in parallel to the series resonant circuit, and
   an output circuit configured to output power generated on the secondary windings, the drive control circuit comprising:
- an output control circuit in electric connection with the output circuit, the output control circuit being configured to generate an output control signal with a pulse width corresponding to an output voltage of the output circuit;
- a threshold setting circuit configured to determine a winding threshold voltage in accordance with the direct current input voltage applied to the series resonant circuit;
- a winding detection circuit in electric connection with the tertiary winding of the isolation transformer, the winding detection circuit being configured to compare a voltage generated in the tertiary winding with the winding threshold voltage, and to output a winding detection signal based on a result of the comparison; and
- a drive circuit configured to receive the winding detection signal and the output control signal, and to generate a pulse-width controlled drive signal for driving the first switching element.

6. The drive control circuit of claim 5, wherein the drive circuit is further configured to
- use a rise of the winding detection signal as an on-trigger of the pulse-width controlled drive signal,
- use a rise of the output control signal as an off-trigger of the pulse-width controlled drive signal, and
- generate the pulse-width controlled drive signal using the on-trigger and the off-trigger.

7. The drive control circuit of claim 5, wherein the threshold setting circuit is configured to
- set the winding threshold voltage to be high upon detecting that the direct current input voltage is higher than a preset threshold voltage, and
- set the winding threshold voltage to be low upon detecting that the direct current input voltage is lower than the threshold voltage.

8. A drive control method for a switching power supply device that includes
- an isolation transformer having a primary winding, a tertiary winding and a plurality of secondary windings, the primary winding being connected to a direct current voltage source via a capacitor, leakage inductance of the isolation transformer and the capacitor forming a series resonant circuit,
- a first switching element connected in series to the primary winding,
- a second switching element connected in parallel to the series resonant circuit, and
- an output circuit configured to output power generated on the secondary windings, the method comprising:
- receiving, by an output control circuit, an output signal from the output circuit, and generating an output control signal with a pulse width corresponding to an output voltage of the output signal;
- setting, by a threshold setting circuit, a winding threshold voltage in accordance with the direct current input voltage applied to the series resonant circuit; comparing, by a winding detection circuit, a voltage generated in the tertiary winding of the isolation transformer with the winding threshold voltage, and generating a winding detection signal based on a result of the comparison; and
- receiving, by a drive circuit, the winding detection signal and the output control signal, and generating a pulse-width controlled drive signal for driving the first switching element in accordance with the received winding detection signal and output control signal.

9. The drive control method of claim 8, wherein the generating a pulse-width controlled drive signal includes
- using a rise of the winding detection signal as an on-trigger of the pulse-width controlled drive signal,
- using a rise of the output control signal as an off-trigger of the pulse-width controlled drive signal, and
- generating the pulse-width controlled drive signal using the on-trigger and the off-trigger.

10. The drive control method of claim 8, wherein the setting the winding threshold voltage includes
- setting the winding threshold voltage to be high upon detecting that the direct current input voltage is higher than a preset threshold voltage, and
- setting the winding threshold voltage to be low upon detecting that the direct current input voltage is lower than the threshold voltage.

* * * * *